March 25, 1941.  M. CASTRICUM ET AL  2,235,867
PNEUMATIC TIRE
Filed Dec. 7, 1939
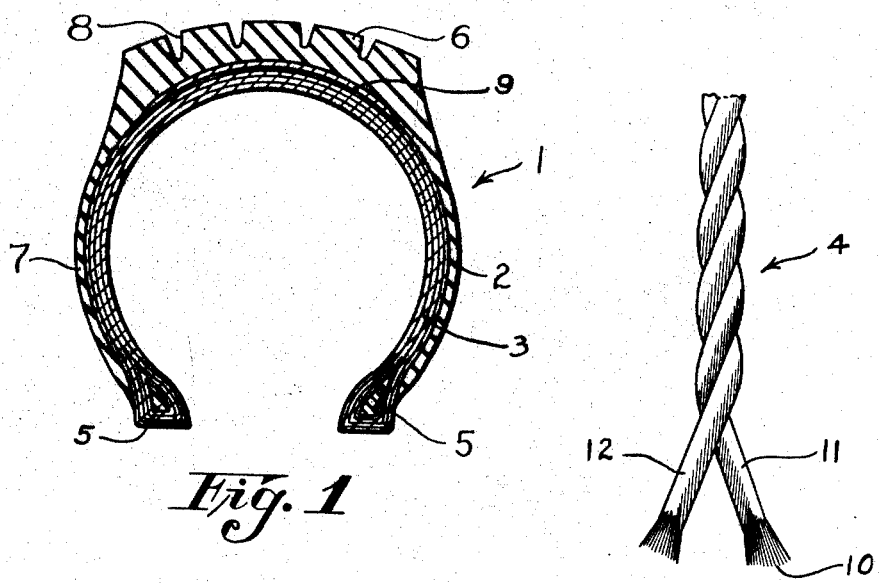
Fig. 1
Fig. 2
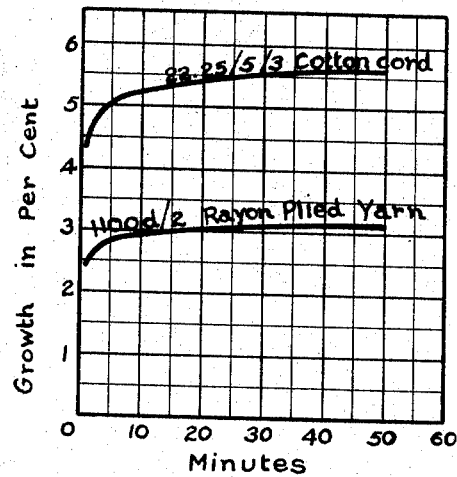
Fig. 3
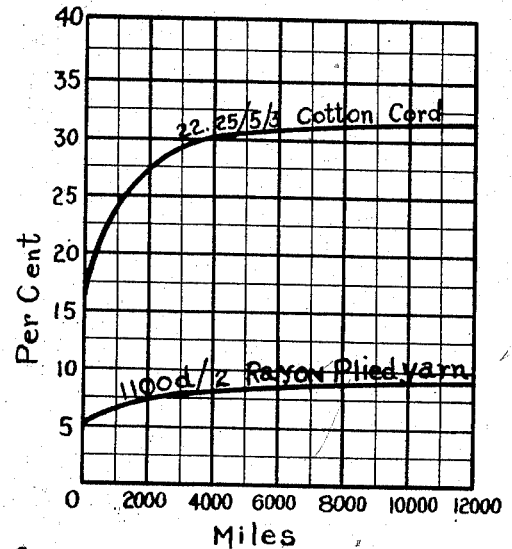
Fig. 4
INVENTOR.
MARTIN CASTRICUM
BY FRANCIS C. KENNEDY
ATTORNEYS.

Patented Mar. 25, 1941

2,235,867

UNITED STATES PATENT OFFICE 2,235,867

PNEUMATIC TIRE

Martin Castricum, Grosse Pointe, and Francis C. Kennedy, Detroit, Mich., assignors to United States Rubber Company, New York, N. Y., a corporation of New Jersey Application December 7, 1939, Serial No. 307,973

15 Claims. (Cl. 152—359)

This invention relates to pneumatic tires for motor vehicles, and more particularly to a pneumatic tire having a relatively thin carcass wherein the strain resisting elements are composed of rayon or other synthetic silk-like materials.

The present application is directed to improvements in the type of thin wall rayon cord tire of our Patent No. 2,188,174, issued January 23, 1940. Said prior patent is directed to a pneumatic tire in which the cord fabric carcass embodies rayon cords of 275d/4/2 or 275d/5/2 construction. We have now determined that further improvements in tire construction can be secured by employing heavy denier plied yarns of rayon as the reinforcing elements in place of the rayon cord reinforcing elements of said patent.

Pneumatic tires tend to grow or increase in the carcass area when inflated, due to the internal air pressure to which the tire is subjected in use. This growth causes cracks to appear in the side-walls of the tire and bottom of the tread grooves, and is otherwise objectionable.

The present invention contemplates a tire construction in which the growth is much less than in the tires now in general use, and which also provides substantial economy and other advantages in a rayon tire construction.

As pointed out in our patent above cited, the use of rayon reinforcing elements in tires gives increased strength over cotton cord of the same size and this makes possible the construction of a tire carcass having much thinner walls than in the usual cotton cord tire.

By employing rayon reinforcing elements constructed either as disclosed in said patent or as herein contemplated an increase in strength over cotton cord is secured. This makes it practical to employ smaller gauge reinforcing elements than in the usual cotton cord tire, which in turn makes it practical to employ more ends of reinforcing elements per inch than heretofore. These smaller reinforcing elements do not need to be provided with as thick a stratum of rubber as heretofore so that a considerable reduction in ply fabric thickness is secured. This all resulting in a substantial reduction in the thickness of the tire carcass.

It is well known that it is necessary to provide tire cord with a considerable amount of stretch or resiliency to prevent tire failure. This stretch is required largely to accommodate the flexing or bending of the carcass walls when the tire is in use.

We have determined that a substantial reduction in the thickness of the tire carcass, which may be secured by the use of rayon reinforcing elements as herein contemplated, makes practical a reduction in the amount of stretch needed in the rayon reinforcing elements, since the inherent stretch necessary in the cord or yarn to accommodate the flexing or bending of a thin carcass wall is less than that required by the thicker carcass walls now in general use.

Furthermore this reduction in the thickness of the tire carcass lessens the generation of heat by the tire when the vehicle is in motion, and the thinner tire walls promote a more rapid radiation of the heat to the cooler tire surface, all of which helps to keep the present tire from overheating.

An extremely important feature of the present invention therefore resides in a tire construction in which the rayon reinforcing elements are so constructed and embodied in a thin tire carcass that they serve to restrict the tire growth far below that which takes place in the tires now in general use.

Another important feature resides in a two-ply rayon yarn in which the relatively large single yarns are twisted in one direction and the ply is twisted in the opposite direction to provide the final heavy two-ply yarn from which the various plies of the tire carcass are made.

In carrying out the present invention, we provide a thin wall, growth resisting pneumatic tire which, in general, comprises a carcass embodying a plurality of plies of rayon or artificial silk two-ply yarns and stratums of vulcanized rubber composition intermediate and bonded to the yarns the majority of the rayon yarns being of 1100d/2 construction, of a gauge not more than .022 inch and having a tensile strength of approximately 2.55 grams per denier and an elongation at 10 pounds load of the order of 9.36 per cent. The number of two-ply yarns forming the principal plies are arranged in the order of 34 or more ends per inch and adaptable for normal operation at about 2½ per cent. elongation, whereby the low elongation of this two-ply yarn under normal operating conditions serves to minimize tire growth and subsequent tread cracking.

Growth in pneumatic tires is a detrimental condition, as it produces a change in the characteristics of the tire elements from the desirable attributes originally imparted thereto, and causes the tire to operate under different conditions from those under which it was intended to operate. Briefly, growth may be defined as a permanent increase in the general dimensions of the tire due to inflation and to operation of the inflated tire.

It has been demonstrated that, in conventional tires, inflation alone results in a substantial growth or increase in the general dimensions of a tire, and that a further growth or increase in dimensions results as the tire is continued in service. A great amount of highly skilled engineering and uniformity of processing is required to attain a precision product in pneumatic tires. The growth of a tire results in substantial changes in the tire constituents, negatives much of the accuracy of engineering and processing, and increases the difficulty of determining the functional characteristics of a tire in service. Control of tire growth is, therefore, a fundamental step toward quality control of pneumatic tires and a reduction in tire growth below that now commonly experienced is highly desirable.

A further objectionable feature of tire growth is that it imparts tension strains to the rubber composition forming the tread and sidewall portions of the tire. It is well known that tension strains in the rubber tread or sidewall are conducive to cracking. Where an anti-skid tread pattern includes grooves extending substantially circumferentially of the tire, tension strains due to tire growth are concentrated at the base of the grooves and cracking of the rubber composition is promoted. Frequently tread groove cracking leads to premature failure of the tire.

Therefore an important object of the present invention is to provide a pneumatic tire in which growth of the tire due to inflation and service is substantially reduced; and in which cracking of the rubber composition in the tread and sidewall regions of the tire is eliminated or substantially reduced.

The above and other features of the invention will appear more fully in the following detailed description when considered in connection with the accompanying drawing, in which:

Fig. 1 is a transverse view, in section, of a pneumatic tire embodying the features of the present invention;

Fig. 2 is a plan view of a portion of a ply-twist yarn as embodied in the tire shown in Fig. 1.

Fig. 3 is a graph illustrating, in comparison with cotton tire cords of certain specific construction, the low elongation characteristics of the ply-twist yarn forming an element of our invention; and, Fig. 4 is a graph illustrating comparative tire growths, for cotton and rayon constructions, in the region of the tread grooves.

In order to attain the desired reduction in tire growth herein contemplated, it is found that such result cannot be obtained by any change in the tire cord alone or other single constituent elements, but can be obtained only by employing a cord of critical characteristics in combination with a relative proportionment of the tire carcass.

With reference to the drawing and, in particular, to Fig. 1, there is disclosed a pneumatic tire 1 having a carcass 2 comprising plies or sheets of fabric 3 formed of strain resisting elements 4 (Fig. 2) attached to bead wires 5. Bonded to the carcass 2 is a layer of rubber composition forming, in part, a tread 6 and sidewall portions 7. As characteristic with most conventional tires, the tread 6 includes an anti-skid pattern defining circumferentially extending grooves 8.

Breaker fabric plies 9 may be embedded between the carcass 2 and tread 6 when desired.

The strain resisting element 4 is a plied yarn in contrast to the cord commonly used in tire construction, and is made of two relatively large single yarns each of which is formed of the filaments 10 of rayon or artificial silk. Preferably, the filaments 10 are formed of high tenacity rayon, having a tensile strength equivalent to at least 3.36 grams per denier. The single yarns 11 and 12 are twisted in one direction and the ply twist is in the opposite direction so that one twist may tend to balance the other in the resulting plied yarn 4.

This plied yarn 4 for the sake of clearness will be hereafter called a "ply-twist yarn" except in the drawing where it is designated in the graphs as a "Rayon plied yarn." The words "plied yarn" may possibly be regarded as including a cord or cable construction. Therefore the words "ply-twist yarn" have been employed herein as identifying terminology for designating two yarns twisted together to form the final reenforcing element.

Each of the yarns 11 and 12 may be formed of a bundle of about 480 rayon filaments each of which is about 2.29 denier, which is a present standard commercial size. A yarn of such size is referred to as an 1100 denier yarn, and when two such yarns are twisted together, the result is an 1100d/2 construction.

One of the important requirements of the ply-twist yarn 4 as a constituent of the invention is a relatively low gauge and a twist combination resulting in the ply-twist yarn having a relatively high tensile strength and low elongation. These and other characteristic features of the ply-twist yarn are illustrated in the following table:

| | |
|---|---|
| Construction | 1100d/2 |
| No. of filaments | 480 |
| Twist direction | RL |
| Yarn twist | 15.25 |
| Ply twist | 11.20 |
| Gauge | .022 inch |
| Elongation at 10 lbs | 9.36% |
| Elongation at break | 11.76% |
| Cord tensile (lbs.) | 13.80 |
| Cord tensile (g/d) | 2.55 |
| Yards per pound | 1880 |

The ply-twist yarns 4 embodying characteristics substantially as described above are formed into a fabric sheet and encased within layers of rubber composition. Prior to the application of the encasing layer of rubber composition, the ply-twist yarn may be treated in a bath for depositing a coating of rubber thereupon. It is highly desirable in order to secure the necessary strength to provide at least 34 ply-twist yarns or ends per inch in the fabric sheet. This refers to the principal fabric plies 3 which form the tire carcass 2 as distinguished from the outer or breaker fabric plies 9. Also, the first or band ply is usually subjected to special treatment, and reference to "principal" plies is intended to indicate those plies which are similar in thickness and which predominate in number in the formation of the carcass.

It is essential in order to secure the low growth feature herein contemplated to maintain a maximum limitation on the total thickness of the fabric ply, including the ply-twist yarn and the skim coat of rubber composition applied to each side of the sheet of ply-twist yarns. This thickness varies according to whether the plies are used to form the carcass of passenger car tires or heavy service tires. In the heavy tires, which usually have a larger transverse carcass area than passenger tires and a greater number of plies, it is customary to apply an additional layer of rubber composition called "recoat" to each fabric ply. The principal fabric plies embodying the above described 1100d/2 ply twist yarn construction have the following features:

|  | 1100d/2 rayon | 22.25/5/3 cotton |
| --- | --- | --- |
| No. ends per inch (passenger) | 34 | 23 |
| No. ends per inch (heavy service) | 34 | 23.5 |
| Total ply thickness (passenger) inches | .035 | .050 |
| Total ply thickness (heavy service) do | .046 | .064 |

This table gives the ends per inch and total ply thickness of the ply sheet before vulcanization and before assembling the sheet into a tire.

It is found that by employing the construction of the present invention a four ply passenger tire capable of giving as good service as the four ply cotton cord passenger tires now in general use, may be constructed with a total carcass thickness of not more than .152" including the first ply and three principal plies.

By passenger car tires we refer to such sizes as: 5.00–19; 5.25–17 and 18; 5.50–16, 17, 18 and 19; 6.00–16, 17, and 18; 6.25–16; 6.50–16 and 17; and 7.00–15 and 16. By heavy service tires we refer to balloon tire section sizes having six or more plies, as: 6.00, 6.50, 7.00, 7.50, 8.25, 9.00, 9.75, 10.50, 11.25, 12.00, 12.75, and 13.50; and to high pressure type sizes 30 x 5, 32 x 6, 34 x 7, 36 x 6, 38 x 7, 36 x 8, 40 x 8, 42 x 9, 40 x 10, and 44 x 10. While these sizes are exemplary of the distinction between heavy service and passenger car tires, it is to be understood that their equivalents are contemplated within the meaning of the illustration.

Pneumatic tires embodying the specially constructed strain resisting elements of our invention, and arranged in plies as described, have the unique characteristic of resisting tire growth much more effective than heretofore and its consequent detrimental effects. The graph illustrated in Fig. 3 shows from actual tests the per cent. growth over a period of one hour of an 1100d/2 ply-twist yarn of our embodiment, in comparison with a conventional cotton cord of 22.25/5/3 construction having a gauge of .032 inch, an elongation at 10 pounds load of 13.7 per cent., a cord tensile of 21 pounds, and yarn, ply and cable twist of 17.4 L., 21.5 L., and 9.25 R., respectively.

The remarkable reduction in growth illustrated by the graph of Fig. 3 was determined by subjecting the cotton cord and rayon ply-twist yarn to identical test conditions; that is these individual cotton and rayon strain resisting elements were subjected to loads proportional to the loads sustained by these respective elements in service under a constant temperature of 200° F.

While the foregoing growth comparison refers to the strain resisting elements alone, the growth condition is further demonstrated by measurements taken from actual tires. Data have been obtained indicating the resulting growth of a conventional cotton cord tire and the improved tire embodying our 1100d/2 rayon ply-twist yarn, both tires being designed for the same service.

The cotton cord tire, after operating service of 7,000 miles, showed an increase in the general volumetric dimension of the tire chamber to the extent of 6.32 per cent. The tire embodying the features of the present invention and designated as 1100d/2 construction showed a growth increase after operating service of 7,000 miles in the order of only 2.00 per cent. Comparatively, this represents a substantial reduction in tire growth. These tests are average results of a number of tires.

It is well known that in tires embodying substantially circumferentially extending grooves, tire growth is greater in the region of the groove base. Fig. 4 illustrates comparatively the resulting groove growth of a conventional cotton cord tire and a tire embodying the rayon ply-twist yarn of the present invention, both tires being designed for the same service. As shown in Fig. 4, groove strain, or tire growth, in the region of the groove base of the cotton cord tire indicates an increase of 13.8 per cent. upon inflation, and a strain of 31.7 per cent. at 12,000 miles. The improved tire of the present invention showed an increase of only 5.3 per cent. upon inflation and 8.3 per cent. at 12,000 miles. These figures are the average results of a number of tested tires. Groove measurements were taken from metal castings formed in the grooves after each test.

Because of the concentration of strains at the base of tread grooves, objectionable cracking in the region of the groove base occurs. In many cases the cracking results in premature failure of the tire. As an example of the detrimental effects of groove cracking, actual comparative tests indicate that a conventional cotton cord tire, at 12,000 miles, showed 18.5 per cent. groove cracking, whereas the improved tire showed only .8 per cent. groove cracking. These are average results of a number of tests in which groove cracks were measured on the basis that in one groove a crack extending continuously around the circumference and of the full depth of the tread rubber was equal to 100 per cent.

Tire growth also imparts tension strains in the region of the rubber composition at the sidewall portions of the tire, and these tension strains are likewise conducive to detrimental cracking. Our improved tire results in a substantial decrease in cracking at the sidewall portions of the tire.

These illustrations serve to show the importance of reducing tire growth. In the present invention, tire growth has been minimized to an extent far below any reduction heretofore attained. This improvement is made possible by a unique arrangement and proportionment of the elements forming the tire carcass, which includes a critical control of those factors which are inseparably inter-related to produce a commercially practical growth resisting tire. These factors include limitations in the number and denier of the rayon yarns, the gauge of the ply-twist yarn, the yarn twist and ply-twist with the resulting effect on tensile strength and elongation, in the number of ply-twist yarns ends per inch in the fabric, and in the total thickness of the rubber coated plies.

The construction of the ply-twist yarn, because it is formed of only two relatively heavy denier yarns, permits efficient and economical processing, and is well suited for a low gauge plied yarn. This low gauge ply-twist yarn permits a decrease in total ply thickness, and permits an increase in the number of ply-twist yarn ends per inch in the fabric. The twist combination results in a ply-twist yarn having a relatively low elongation and a relatively high tensile strength. The high tensile strength permits a reduction in the weight or size of strain resisting elements embodied in the carcass, while the reduction in elongation is permissible only in view of the increased flexibility of the thin carcass and the capability of the carcass to resist fatigue because of the reduction in ply thickness.

All of the yarn characteristics above given are based on standard test conditions at 70° F. and 60% relative humidity. A pneumatic tire in service does not operate under these conditions but does operate under moisture conditions somewhere between 70° F. and 60% relative humidity and the bone dry condition. It is not known just where this operating range may lie, but we know that it lies closer to the bone dry condition than it does to the 70° F. and 60% standard test condition.

As above stated the present tire has a much lower tire growth than the cotton cord tires now in general use. This is due to the reasons above given and also to the fact that the present rayon ply twist yarn increases in strength and also undergoes a pronounced reduction in stretch or elongation properties as its moisture content is reduced.

The following table in which the present ply twist yarn and the fabric made therefrom is compared with a commonly used cotton tire cord and the fabric made therefrom, throws considerable light on the reason why the present tire has such a low growth.

|  | 1100d/2 rayon | 22.25/5/3 cotton |
| --- | --- | --- |
| Ends per in. in fabric | 34 | 23 |
| Tensile per end at 70° F. and 60% R. H. pounds | 13.8 | 21.0 |
| Tensile per end at bone dry do | 16.6 | 17.0 |
| Tensile per in. of ends at 70° F. 60% R. H. do | 469 | 483 |
| Tensile per in. of ends at bone dry do | 564 | 391 |
| Elongation per end at 10 lbs. at 70° F. and 60% R. H. per cent | 9.36 | 13.7 |
| Elongation per end at 10 lbs. at bone dry do | 4.75 | 10.37 |
| Bone dry decrease per end in stretch do | 49 | 24 |

It will be noted from this table that under bone dry condition there is a substantial increase in the tensile strength of the present rayon yarn and a substantial decrease in the tensile strength of the cotton cord. Also that the elongation of the rayon yarn at 10 lbs. load drops from 9.36% at standard test condition to 4.75% at bone dry condition, thus representing a decrease in stretch of 49%. The cotton cord at 10 pounds load drops from 13.7% elongation at standard test condition to 10.37% at bone dry condition, which represents a decrease in stretch of 24% as compared with the 49% for the rayon.

A further understanding of the distinctive features of the present tire over the prior constructions may be secured by comparing the strength of one inch width of the ply construction with the weight per square yard of the reenforcing elements of such ply.

In the immediately preceding table the tensile per inch of the present ply at 70° F. 60% R. H. is given as 469 lbs. In another table the yards per pound of the present 1100d/2 construction is given as 1880, and the ends per inch in the ply is given as 34. From this it will be seen that $$\frac{34 \times 36''}{1880} = .650 \text{ lbs. wt. per square yard,}$$

and $$\frac{469 \text{ lbs.}}{.650 \text{ lbs.}} = 720 \text{ ratio}$$

for the present ply structure.

Referring again to the immediately preceding table, the 22.25/5/3 cotton cord now extensively used runs 1025 yds. to the pound, the ends per inch is given as 23, and the tensile per inch of the cord at 70° F. 60% R. H. is given at 483 lbs. From this it will be seen that $$\frac{23 \times 36''}{1025} = .807 \text{ lbs. wt. per square yard,}$$

and $$\frac{483}{.807} = 598 \text{ ratio}$$

for the prior cotton ply as compared with 720 ratio of the present rayon ply.

The specific yarn and ply twists as recited herein are designed as desirable twists for the yarn size of 1100 denier. However, the invention contemplates a yarn size of not over 1100, and, therefore, it is intended to include yarn and ply twists corresponding to lighter yarn sizes. In order to maintain a comparable relationship between yarn size and twist, it is expedient to adopt a factor representing the true relationship. Such factors may be obtained by dividing the yarn twist by the square root of the number of yards per pound of the yarn; and, by dividing the plied yarn twist by the square root of the number of yards per pound of the ply twist yarn. The resulting factor multiplied by the square root of the yards per pound indicates the correct twist. The following table lists the data pertinent to the determination of relative twists:

| | |
| --- | --- |
| Yarn twist turns per inch | 15.25 |
| Yards per pound (yarn) | 3800 |
| Yarn twist factor | .247 |
| Plied yarn twist turns per inch | 11.20 |
| Yards per pound (plied yarn) | 1880 |
| Plied yarn twist factor | .258 |

From the foregoing defined characteristics the invention provides a product which by a novel proportionment, an unique arrangement, and combination produces a practical and commercially successful pneumatic tire capable of overcoming many of the difficulties encountered in present day tire manufacture. Incidental to the beneficial advance in restraining tire growth and eliminating or reducing cracking of the rubber composition are the additional advantages of a reduction in tire weight; reduction in carcass thickness, which results in less generation of heat; consumption of less power in operating the vehicles equipped with these tires; has a strength at least equal to conventional tires now in use; provides adequate fatigue resistance; requires less material; may be processed more efficiently; and, is more economical of manufacture and gives good service.

The herein described characteristics of the rayon plied yarn and cotton cord were determined on a Scott pendulum type testing machine of 50 pounds load capacity, the lower jaw of which moves at a rate of 12 inches per minute. Cords and plied yarns are tested on machines having the cam clamp type of jaws spaced to provide a distance of 10 inches between nips. It is to be understood that all computations of the denier of rayon plied yarns constituents are based on conditions of 12 per cent. moisture regain.

Yarn, ply, and cable twists are considered as manufacturing twists; that is, the twists are those imparted to the constituents in the manufacturing operation. Unless otherwise specified, the cord or plied yarn characteristics herein given are determined from the cord or plied yarn prior to their embodiment into the tire carcass.

Having thus described our invention, what we claim and desire to protect by Letters Patent is:

1. A pneumatic passenger tire having low growth characteristics, comprising a four ply growth resisting carcass each ply being formed of rayon ply-twist yarns and a stratum of vulcanized rubber composition, the majority of said ply-twist yarns being not heavier than 1100 denier/2 construction of a gauge not more than .022 inch and having a tensile strength of approximately 2.55 grams per denier and an elongation at 10 pounds load of not appreciably over 9.36 per cent., the total thickness of said four plies before vulcanization being not more than .152 inch, whereby the low elongation of the ply-twist yarns in this thin carcass is sufficient to accommodate the service requirements of the carcass and is adapted also largely to reduce the tire growth and consequent tread cracking.

2. A pneumatic passenger tire having low growth characteristics, comprising a growth resisting carcass embodying a plurality of plies formed of rayon ply-twist yarns and stratums of vulcanized rubber composition intermediate and bonded thereto, the majority of said ply-twist yarns being not heavier than an 1100 denier/2 construction, of a gauge not more than .022 inch, a single yarn twist per inch of not more than .247 times the square root of the yards per pound of single yarn, a ply twist per inch of not more than .258 times the square root of the yards per pound of the ply twist yarn, and having a tensile strength of approximately not less than 2.55 grams per denier and an elongation at 10 pounds load of not appreciably over 9.36 per cent., and the number of ply-twist yarns forming the principal plies being arranged in the order of 34 ends per inch, whereby the low elongation of the ply-twist yarns in this thin carcass is sufficient to accommodate the service requirement of the carcass and is adapted also largely to reduce the tire growth and consequent tread cracking.

3. A pneumatic tire having low growth characteristics, comprising a growth resisting carcass embodying a plurality of plies formed of rayon ply twist yarns and stratums of vulcanized rubber composition intermediate and bonded thereto, the majority of said ply-twist yarns being an 1100 denier/2 construction, of a .022 inch gauge, and having a tensile strength of approximately 2.55 grams per denier and an elongation at 10 pounds load of approximately 9.36 per cent., the number of said ply-twist yarns forming the principal plies being arranged in the order of 34 ends per inch, to thereby form a carcass in which the low elongation of the ply-twist yarns is sufficient to accommodate the requirements of the thin carcass while these low elongation yarns greatly restrict the tire growth and consequent tread cracking.

4. A growth resisting pneumatic tire comprising a carcass embodying a plurality of plies of ply-twist yarns of artificial silk not heavier than an 1100 denier/2 construction and of a gauge not over .022 inch, each ply being so constructed that the ratio of the strength per inch width thereof to the weight per square yard of said ply-twist yarns is not less than 700.

5. A pneumatic tire for use in the passenger car field, comprising a carcass embodying a plurality of plies formed of rayon ply-twist yarns and stratums of vulcanized rubber composition intermediate and bonded thereto, the majority of said ply-twist yarns being not heavier than an 1100 denier/2 construction, and having a gauge not over .022 inch, and each principal ply before vulcanization being not over .035 inch thick.

6. A pneumatic tire for use in the heavy service field, comprising a carcass embodying a plurality of plies formed of rayon ply-twist yarns and stratums of vulcanized rubber composition intermediate and bonded thereto, the majority of said ply-twist yarns being not heavier than an 1100 denier/2 construction and of a gauge not more than .022 inch, and the principal plies before vulcanization averaging in thickness not over .046 of an inch.

7. A pneumatic tire comprising a carcass embodying a plurality of plies formed of rayon ply-twist yarns and stratums of vulcanized rubber composition intermediate and bonded thereto, the majority of said ply-twist yarns being not heavier than an 1100 denier/2 construction, and of a gauge not more than .022 inch, and each principal ply having a bone dry tensile per inch width of the ply of at least 564 pounds.

8. A pneumatic tire, comprising a carcass embodying a plurality of plies formed of rayon ply-twist yarns and stratums of vulcanized rubber composition intermediate and bonded thereto, the majority of said ply-twist yarns being not heavier than an 1100 denier/2 construction and of a gauge not more than .022 inch, and each principal ply being formed of ply-twist yarns of the order of 34 to the inch.

9. A pneumatic tire for use in the field described, comprising a growth resisting carcass embodying a plurality of plies formed of rayon ply-twist yarns and stratums of vulcanized rubber composition intermediate and bonded thereto, the majority of said ply-twist yarns being not heavier than an 1100 denier/2 construction, of a gauge not more than .022 inch, and having an elongation at 10 pounds load of not over 9.36 per cent.

10. A pneumatic tire for use in the field described, comprising a growth resisting carcass embodying a plurality of plies formed of rayon ply-twist yarns and stratums of vulcanized rubber composition intermediate and bonded thereto, the majority of said ply-twist yarns being not heavier than an 1100 denier/2 construction, of a gauge not more than .022 inch and having an elongation at 10 pounds load of not over 9.36 per cent, and said ply-twist yarns also having a bone dry tensile per inch width of the ply of at least 564 pounds.

11. A pneumatic tire for use in the field described, comprising a growth resisting carcass embodying a plurality of plies formed of rayon ply-twist yarns and stratums of vulcanized rubber composition intermediate and bonded thereto, the majority of said ply-twist yarns being not heavier than an 1100 denier/2 construction, of a gauge not more than .022 inch, and having an elongation at 10 pounds load of not over 9.36 per cent, the number of said ply-twist yarns forming the principal plies being of the order of 34 to the inch and having a bone dry tensile per inch width of the ply of at least 564 pounds.

12. A pneumatic tire comprising a carcass embodying a plurality of plies of ply-twist yarns of artificial silk not heavier than 1100 denier/2 construction and of a gauge not over .022 inch, the single yarns forming the ply-twist yarns having a twist per inch of not more than .247 times the square root of their yards per pound and the ply-twist yarns having a twist per inch of not more than .258 times the square root of their yards per pound and the ratio of strength per inch of width of such plies of carcass fabric to their weight per square yard being not less than .700.

13. A pneumatic tire comprising a carcass embodying a plurality of plies of substantially parallel ply-twist yarns of artificial silk not heavier than 1100 denier/2 construction and of a gauge not over .022 inch, the single yarns forming the ply-twist yarns having a twist per inch of not more than .247 times the square root of their yards per pound and the ply twist yarns having a twist per inch of not more than .258 times the square root of their yards per pound and the ratio of strength per inch of width of such plies of carcass fabric to their weight per square yard being not less than 720.

14. A pneumatic tire comprising a carcass embodying a plurality of plies of ply-twist yarns of artificial silk not heavier than 1100 denier/2 construction and of a gauge not over .022 inch, the ply-twist yarns having a twist per inch of not more than .258 times the square root of their yards per pound, and the ratio of strength per inch of width of such plies of carcass fabric to their weight per square yard being not less than 720.

15. A pneumatic tire comprising a carcass embodying a plurality of plies of ply-twist yarns of artificial silk not heavier than 1100 denier/2 construction and of a gauge not over .022 inch, the single yarns forming the ply-twist yarns having a twist per inch of not more than .247 times the square root of their yards per pound, and the ratio of strength per inch of width of such plies of carcass fabric to their weight per square yard being not less than 720.

MARTIN CASTRICUM.
FRANCIS C. KENNEDY.